United States Patent [19]

Boylan et al.

[11] Patent Number: 5,282,123
[45] Date of Patent: Jan. 25, 1994

[54] CLAMPED MODE DC-DC CONVERTER

[75] Inventors: Jeffrey J. Boylan, Dallas; Richard H. Hock, Garland; Allen F. Rozman, Richardson, all of Tex.

[73] Assignee: AT&T Bell Laboratories, Murray Hill, N.J.

[21] Appl. No.: 992,274

[22] Filed: Dec. 16, 1992

[51] Int. Cl.⁵ ........................................... H02M 3/335
[52] U.S. Cl. ............................................ 363/21; 363/56
[58] Field of Search ............ 363/21, 56; H02M 3/28, H02M 3/335

[56] References Cited

U.S. PATENT DOCUMENTS

| 4,441,146 | 4/1984 | Vinciarelli | 363/20 |
| 5,019,957 | 5/1991 | Wilkinson | 363/56 |
| 5,066,900 | 11/1991 | Bassett | 323/224 |

FOREIGN PATENT DOCUMENTS

| 3837561 | 5/1990 | Fed. Rep. of Germany | H02M 3/28 |
| 58-43016 | 3/1983 | Japan | 363/21 |
| 2-133069 | 5/1990 | Japan | H02M 3/28 |
| 3-207263 | 9/1991 | Japan | H02M 3/28 |
| 2073918 | 10/1981 | United Kingdom | 363/21 |

OTHER PUBLICATIONS

"Adaptive Input Filter Compensation for Switching Regulators," S. S. Kelkar et al., IEEE Transactions on Aerospace and Electronic Systems, vol. AES-20, No. 1, Jan. 1984, pp. 57-66.
"High Power SMPS Require Intrinsic Reliability," B. Carsten, Powerconversion International Proceedings, Sep. 14-17, 1981, Munich, West Germany, pp. 118-133.
"Constant Frequency, Forward Converter with Resonant Transition," I. Jitaru, High Frequency Power Conversion Proceedings, Jun. 9-14, 1991, Toronto, Ontario, Canada, pp. 282-292.
"Simple PWM-FM Control for an Independently-Regulated Dual Output Converter," A. Dauhajre et al., *Proceedings of Powercon 10*, Mar. 21-24, 1983, San Diego, Calif. D-3 pp. 1-8.
"A New High Frequency, Zero-Voltage Switched, PWM Converter," I. D. Jitaru, *APEC '92 Proceedings*, Feb. 1992, pp. 657-664.
"The Double Converter: A Fully Regulated Two-Output DC-to-DC Converter," J. Sebastian et al., PESC Proceedings, 1985, pp. 117-126.

*Primary Examiner*—William H. Beha, Jr.
*Attorney, Agent, or Firm*—Roderick B. Anderson

[57] ABSTRACT

A voltage control circuit comprises a transformer (18) having primary (17) and secondary (20, 21) windings, an input coupled to said primary winding, first and second switch devices (11, 12) each coupled to said primary winding of the transformer, and a clamping capacitor (28) coupled to the transformer and at least one of the first and second switches. An output filter (25, 26) is coupled through a rectifier (23, 24) to the secondary winding of the transformer and an output is taken from the output filter. Means comprising a feedback circuit (13, 14, 15) coupled on one side to the output filter and on the other side to control terminals of the first and second switches cause the first and second switches to conduct current alternately. Operation of the circuit is stabilized by including an interconnection (29) of the clamping capacitor to the feedback circuit for generating a signal that modifies the energy applied by the feedback circuit to the control terminals of the first (11) and second (12) switches.

16 Claims, 6 Drawing Sheets

CLAMPED MODE DC-DC CONVERTER

TECHNICAL FIELD

This invention relates to voltage control circuits and, more particularly, to DC-DC converters of a type known as "clamped mode" DC-DC converters.

BACKGROUND OF THE INVENTION

The copending application of Jacobs et al., Ser. No. 07/981,638, filed Nov. 25, 1992 hereby incorporated herein by reference, describes a DC-DC converter which uses a pair of FET switches, interconnected by a clamping capacitor, to drive a transformer. A pulse width modulator (PWM) causes the FET switches to conduct alternately and to switch when there is a low or possibly zero voltage across the FET switches. The zero-voltage switching results in high efficiency energy conversion, and the use of the external capacitance permits the circuit designer to reduce the rate at which drain-to-source voltages of either FET changes, thereby to reduce the level of conducted or radiated high-frequency electromagnetic wave interference (EMI) which may be undesirably generated by the circuit. The application also discusses how output voltage ripple can be reduced.

Circuit analysis shows that DC-DC converters of this type, which, because of the clamping capacitor, are referred to generally as "clamped mode" circuits, may be unstable if special care is not taken. Design to avoid instability typically results in a deteriorated transient response, output impedance and audio susceptibility. Accordingly, there is still a long-felt need in the industry for reliable, stable DC-DC converters having a high conversion efficiency, and good transient response, output impedance and audio susceptibility characteristics.

SUMMARY OF THE INVENTION

A voltage control circuit, in accordance with an illustrative embodiment of the invention, comprises a transformer having primary and secondary windings, an input coupled to said primary winding, first and second switch devices each coupled to said primary winding of the transformer, and a clamping capacitor coupled to the transformer and at least one of the first and second switches. The secondary winding of the transformer is coupled through a rectifier circuit to an output filter and an output is taken from the output filter. Means comprising a feedback circuit coupled on one side to the output filter and on the other side to control terminals of the first and second switches cause the first and second switches to conduct current alternately. Operation of the circuit is stabilized by including an interconnection of the clamping capacitor to the feedback circuit for generating a signal that modifies the energy applied by the feedback circuit to the control terminals of the first and second switches.

As will become clear later, feeding energy from the clamping capacitor to the feedback circuit results in a cancellation or a reduction of magnitude peaking in the feedback circuit. This removes a primary cause of instability and allows the designer greater flexibility in optimizing other parameters of the circuit. These and other objects, features and advantages will be better understood from a consideration of the following detailed description taking in conjunction with the accompanying drawing.

DETAILED DESCRIPTION

Figure 1:
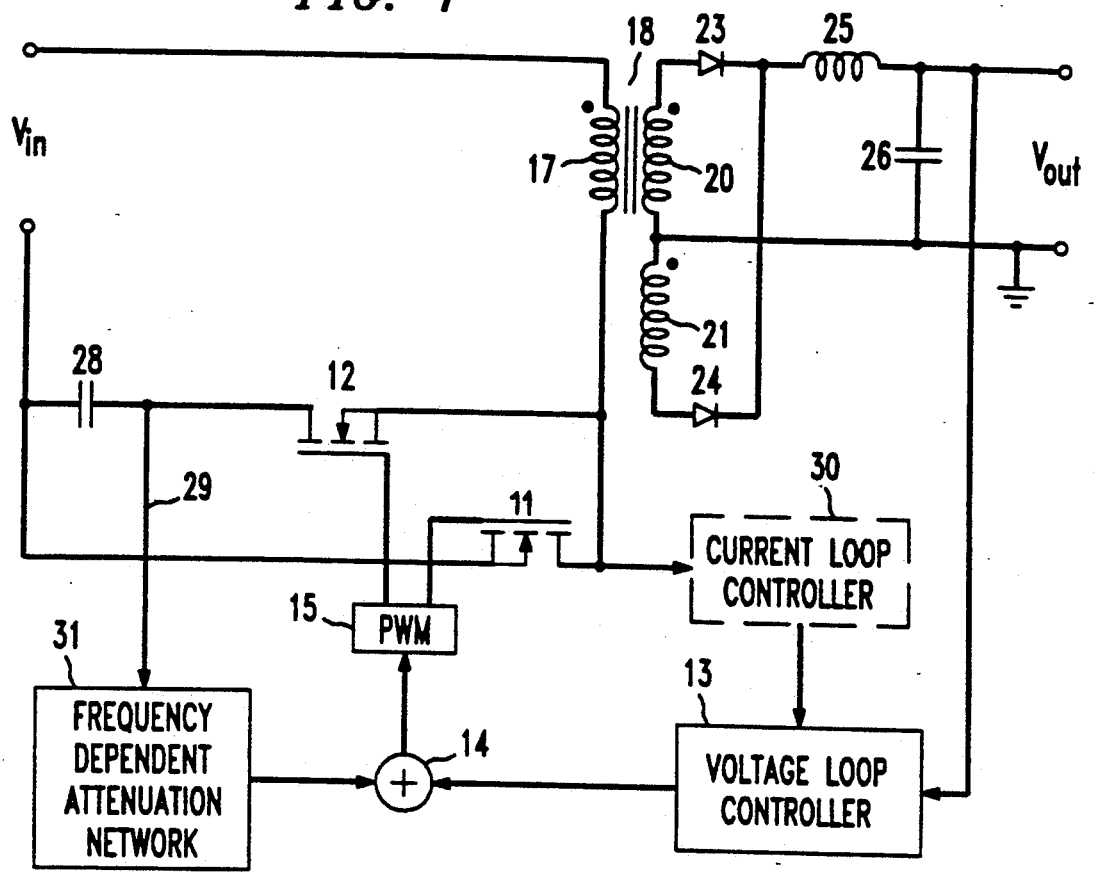
FIG. 1 is a schematic diagram of a DC-DC converter in accordance with one embodiment of the invention.

Referring now to FIG. 1, there is shown schematically a DC-DC converter for supplying a substantially constant output DC voltage $V_{out}$ in response to an input DC voltage $V_{in}$, despite changes in input voltage or changes in the characteristics of the load to which the output is connected. The circuit operates by alternately conducting current through a first switch 11 and through a second switch 12. The switches are controlled by a feedback circuit including a voltage loop controller 13, an adder 14 and a pulse width modulator (PWM) 15. The voltage applied to control terminals of the switches causes switch 11 to conduct for a fraction of each period of alternation known as the duty cycle D, while the switch 12 conducts for most of the remaining interval of the period $(1-D)$. A brief dead-time may be interposed between the conduction intervals to possibly achieve zero-voltage switching, i.e., switching during a time at which there is a zero voltage drop across the switch.

The switches 11 and 12 are typically power FETs and, more specifically, MOSFETs (for Metal Oxide Semiconductor Field Effect Transistor). The control terminals of such devices comprise the gate electrodes. The gate drive signal applied by PWM 15 to switch 11 is a pulse having a time duration D. The gate drive signal applied to switch 12 is a pulse having the time interval $(1-D)$ minus the dead-time interval during which no signal is applied to either gate.

The current alternately flowing through the switches 11 and 12 drives the primary winding 17 of a power transformer 18 in such a manner as desirably to avoid saturation of the core of the transformer. The transformer has secondary windings 20 and 21, wound in the same direction as the primary winding, and connected to rectifying diodes 23 and 24, respectively. The rectifying diodes conduct current alternately to deliver power to an output inductor 25 which is connected to an output capacitor 26. The output capacitor is connected to a transformer tap between secondary windings 20 and 21. The number of windings of secondary 21 may be equal to the number of windings on secondary winding 20, although this is not essential. The diodes 23 and 24 constitute a full-wave rectifier circuit which is connected to an output filter composed of inductor 25 and capacitor 26. The output voltage drives the voltage loop controller to vary duty cycle ratio at which switches 11 and 12 are switched to provide a controlled voltage output, as is known in the art.

A clamp capacitor 28, connected in series with switch 12, charges to a steady-state voltage of $V_{in}/(1-D)$. This clamp capacitor voltage is then connected in series with the primary 17 of the transformer 18 during the $(1-D)$ portion of the switching interval so as to transfer energy stored in the magnetizing inductance of the transformer to the output of the circuit. The application of input voltage $V_{in}$ during the D portion of the switching cycle, along with the capacitor voltage minus $V_{in}$ applied during the $(1-D)$ portion of the cycle, constitutes a means for transferring energy to the output during both portions of the switching cycle. Flux balance in the transformer 18 is achieved, and core saturation is avoided, because the average voltage applied to the primary winding 17 over a complete cycle is zero. A more detailed discussion of the circuit of FIG. 1 and its advantages is given in the aforementioned Jacobs et al. application. As is known in the art, a current loop controller 30 may be included to give greater design flexibility, but such use is not always needed.

A problem with the FIG. 1 circuit is that the effects of the capacitor appear in the duty cycle-to-output transfer function of the converter. Analysis shows that this results in a high Q double pole in addition to the output filter double pole that this results in a high Q double pole in addition to the output filter double pole that normally occurs in the feedback circuit. This causes an extreme phase excursion and a peaking of the feedback voltage. Design of the feedback loop must then be intentionally limited to assure that such factors do not destabilize the apparatus. This in turn may limit the input voltage range of the converter and the operating bandwidth of the feedback circuit, and deteriorate the transient response, output impedance and audio susceptibility of the converter.

In accordance with the invention, this problem is reduced or eliminated by using a conductor 29 to couple the voltage of the capacitor 28 to the feedback circuit of the converter. This coupling is preferably made through a frequency dependent attenuation network 31.

The control to clamp capacitor voltage transfer function contains a high Q double pole that inherently tracks the high Q double pole in the control to output capacitor voltage transfer function. When appropriately added to the feedback network, the high Q double pole of the capacitor voltage tends to cancel the high Q double pole of the feedback loop. The frequency dependent attenuation network 31 is used to scale the capacitor feedback so that it more precisely cancels the peaking in the feedback circuit without affecting efficiency. Network 31 may be a filter having a low-attenuation pass-band including the frequencies of the high Q double pole. The end result is loop gain without sharp peaking. Phase is predictable and smooth, and phase margin is maximized, as is desirable for circuit design. The high bandwidth which is achievable yields an improved transient response and audio susceptibility.

The nature of the high Q double pole which gives rise to the problem mentioned and the nature of the capacitor feedback that combats the problem are described in more detail in the attached APPENDIX. The nature and design of the voltage loop controller 13 is sufficiently well known in the art as not to require further explanation. The frequency dependent attenuation network 31 could comprise passive components such as resistors, capacitors and inductors, or active components such as operational amplifiers. The adder 14 may, for example, be a differential amplifier.

Figure 2:
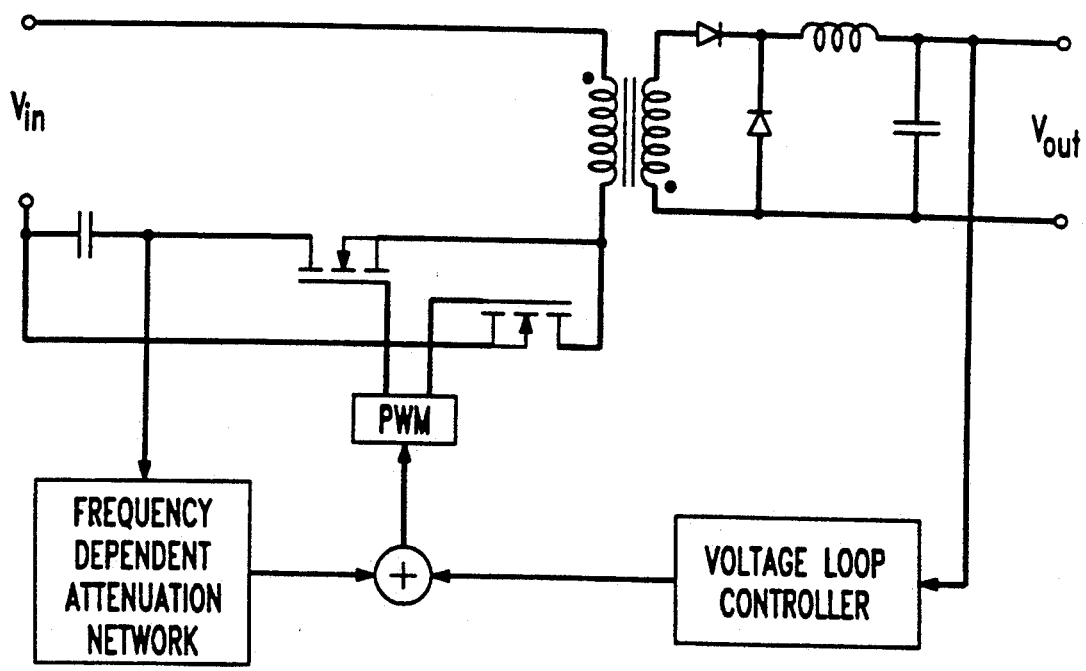
FIGS. 2 and 3 are schematic diagrams of other DC-DC converters with which the invention may be used.
Figure 3:
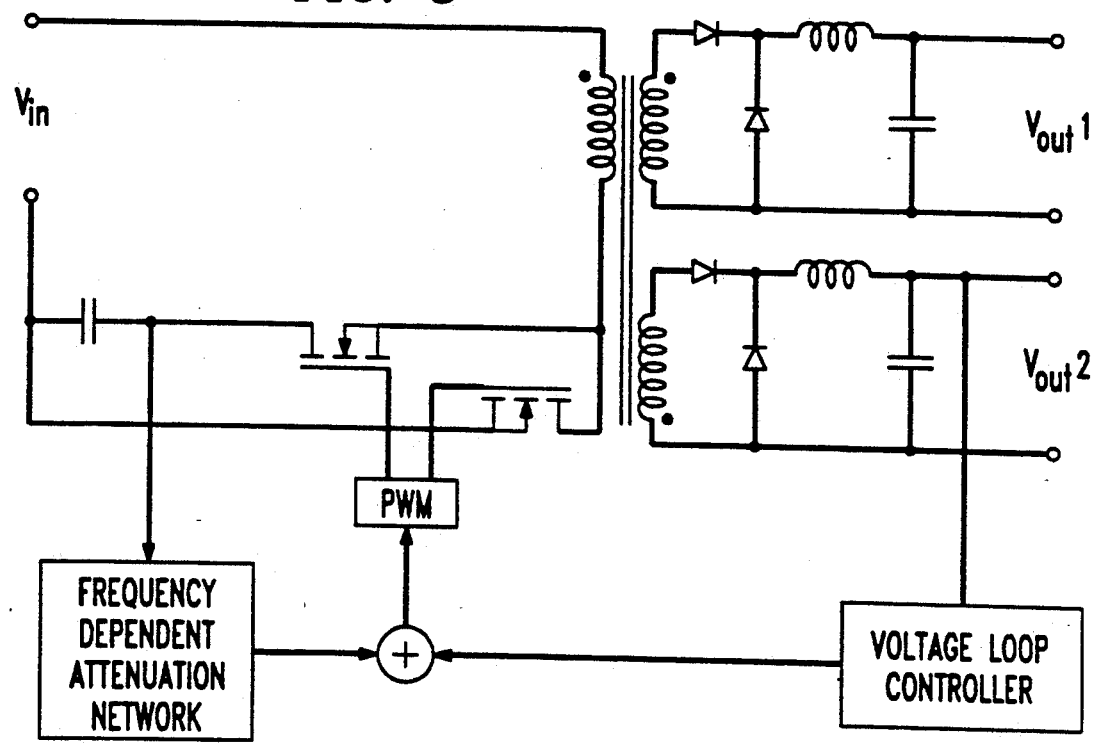

FIGS. 2 and 3 show schematically other forms of DC-DC converters with which the invention may be used. FIG. 2 is a half-wave rectified converter as opposed to the full-wave rectified converter of FIG. 1. FIG. 3 is a dual or multiple output clamp mode converter of the type described in the copending application of Rozman, Ser. No. 07/991,067, filed Dec. 15, 1992. In both of these circuits, feedback from the clamping capacitor to the feedback circuit tends to cancel the effect of the high Q double pole to give the advantages described above.

Figure 4:
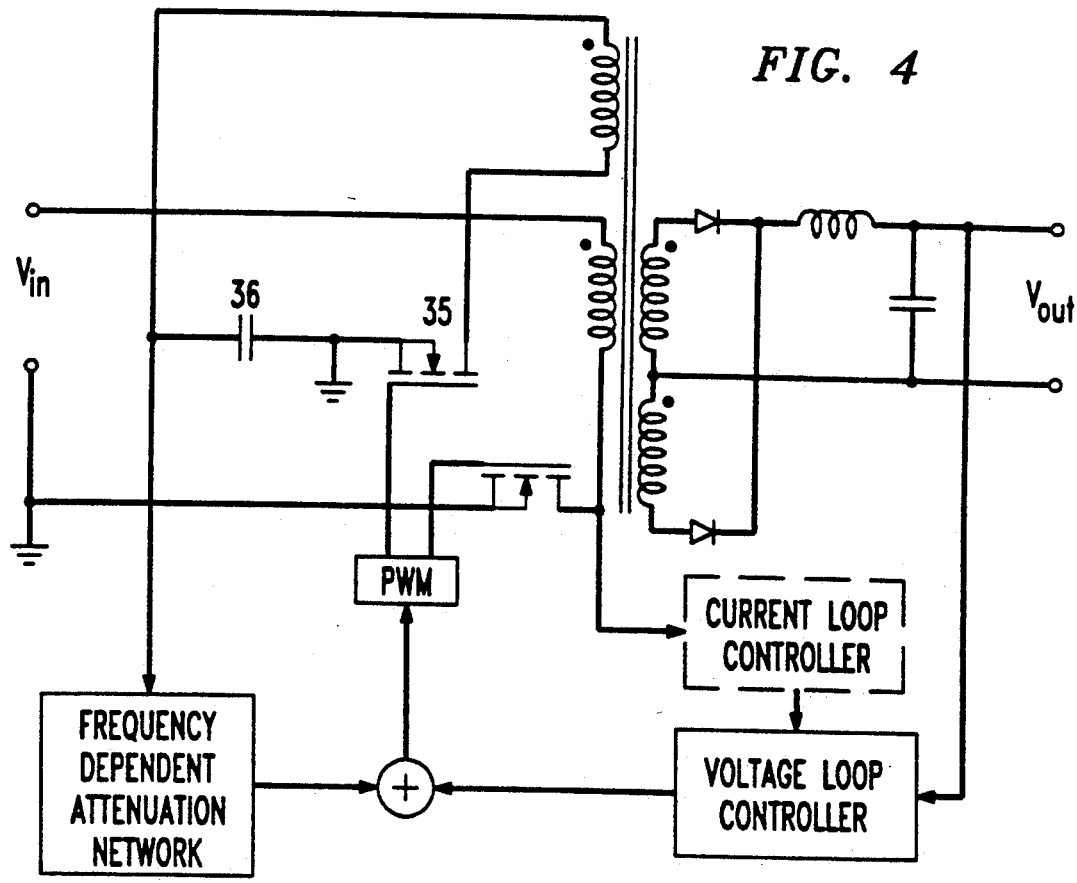
FIG. 4 is a schematic diagram of a DC-DC converter in accordance with yet another embodiment of the invention.

Still another embodiment of a clamped mode converter is shown in FIG. 4. In this configuration, the ground point for FET 35 is chosen so that its gate can be driven in a normal manner, referenced to ground, using a commonly available n-channel enhancement-mode FET. This avoids a more complex gate drive circuit referenced to a floating potential. Additionally, the clamp capacitor 36 can be referenced to either the primary or secondary to ease the control circuit design.

The clamp capacitor state can also be sensed in alternative ways. The most straightforward method is directly sensing the capacitor voltage as has been described. However, capacitor voltage information is also available on the secondary side of the transformer, impressed across the secondary winding during the $(1-D)$ portion of the cycle, and so it could be sensed from the secondary side.

The clamp capacitor feedback gain has been assumed to be scalar and constant in this discussion. With a constant gain, perfect cancellation is only possible at a single operating point. The frequency dependent attenuation network can adjust the gain as a function of duty cycle to allow perfect or near perfect cancellation over all operating conditions.

Various other embodiments and modifications may be made by those skilled in the art without departing from the spirit and scope of the invention.

APPENDIX

The circuit of FIG. 1 provides a boost function which charges the capacitor 28 to a voltage $V_{cl}$ with average value $V_{in}/(1-D)$. This can be derived by solving for the volt-second balance on the primary winding over one complete switching cycle:

$$V_{in} \cdot D = (V_{cl} - V_{in}) \cdot (1-D) \tag{1}$$

where $V_{cl}$ is voltage across capacitor 28, $V_{in}$ is the input voltage and D is the duty cycle. Solving for $V_{cl}$ yields:

$$V_{cl} = \frac{V_{in}}{(1-D)} \tag{2}$$

The capacitor voltage is connected in series with the primary of the transformer during the $(1-D)$ portion of the switching interval so as to transfer the energy stored in the magnetizing inductance of the transformer to the selected output(s) of the converter circuit. The alternating application of the input voltage $V_{in}$ during the (D) portion of the switching cycle and the application of a negative voltage $V_{in}$ minus the capacitor voltage $V_{cl}$ during the (1−D) portion of the cycle provides a means to transfer energy to the output(s) during both portions of the switching cycle. The circuit regulates the output(s) by applying a proportional volt-second product to each output winding over the input voltage range. This volt-second product is then averaged and converted to DC by the output L-C filter(s) (25, 26). The DC transfer function of the full wave rectified version can be derived by solving for the volt-second balance on the output inductor over one switching cycle.

The equation for volt-second balance on inductor 25 is:

$$\left(V_{in} \cdot \frac{ns1}{np} - V_{out}\right) \cdot D = \tag{3}$$

$$\left(\left(\frac{V_{in}}{(1-d)} - V_{in}\right) \cdot \frac{ns2}{np} - V_{out}\right) \cdot (1-D)$$

Solving for $V_{out}$ yields:

$$V_{out} = D \cdot V_{in} \cdot \left(\frac{ns1 + ns2}{np}\right) \tag{4}$$

It can be shown that the circuits of FIGS. 1-3 all have DC transfer functions of the form of equation (4).

As described above, the clamp capacitor (e.g., 28) in these topologies is used to transfer energy from the magnetizing inductance of the transformer to the output. This energy transfer occurs during the (1−D) portion of the switching cycle. As a result, the clamp capacitor capacitance and the magnetizing inductance appear in the duty cycle-to-output transfer function of the converter. A state space analysis of the circuit depicted in FIG. 1 confirms that the transfer function represents a fourth order system (as opposed to the second order characteristic of traditional converter topologies). The characteristic equation of the converter circuit (which will appear in the denominator of all transfer functions of interest) can be shown to be:

$$f(s) = \left(s^2 + \frac{s}{R_e \cdot C_e} + \frac{1}{(L_m + L_e) \cdot C_e}\right) \cdot \tag{5}$$

$$\left(s^2 + (1-D)^2 \frac{L_m + L_e}{C_{clamp} \cdot L_m \cdot L_e}\right)$$

where
s is the complex variable of frequency, i.e., jω,
$C_e$ is the equivalent value of $C_{out}$, the capacitance of capacitor 26, reflected to the primary,
$L_e$ is the equivalent value of $L_{out}$, the inductance of inductor 25, reflected to the primary,
$R_e$ is the equivalent value of load resistance reflected to the primary,
$L_m$ is the magnetizing inductance of the power transformer 18, and
$C_{clamp}$ is the capacitance of clamp capacitor 28.

Equation (5) makes the assumptions that the value of the output capacitor (26) reflected to the primary side is much greater than $C_{clamp}$, and that the secondary turns ratio corresponds to ns1:ns2=1. These assumptions allow for significant simplification of the equation for a better intuitive understanding of the problem; however, none of these assumptions is essential. Equation (5) displays the following:

Two complex pole pairs are present in the transfer functions of the converter. The pole pair associated with the output filter (25 and 26) will be referred to as the first pole pair. The pole pair associated with $L_m$ and $C_{clamp}$ will be referred to as the second pole pair.

The second pole pair is undamped for the ideal circuit model (no parasitic losses included) and is therefore a high Q pole pair in an efficient, practical circuit.

The resonant frequency of the second pole pair moves as a function of duty cycle (and therefore as a function of input voltage).

The second pole pair is introduced due to the role of the clamp capacitor ($C_{clamp}$) in the converter, and will be present in any clamped mode converter which transfers energy to the output during the (1−D) portion of the switching cycle.

Figure 5:
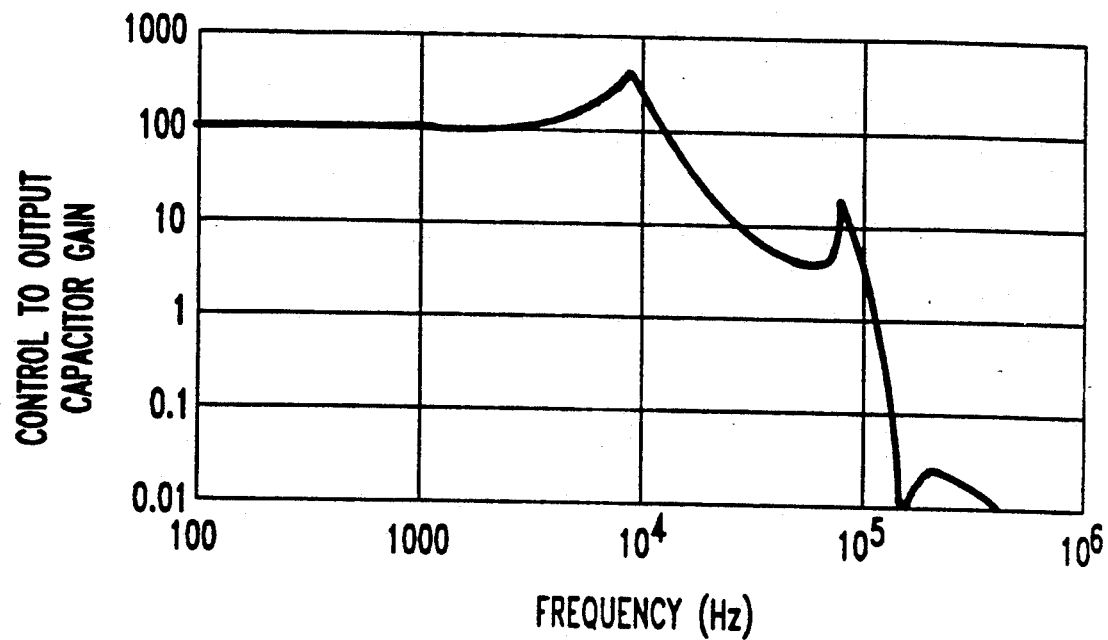
FIGS. 5A and 5B are graphs of control to output capacitor gain and control to output capacitor phase of the circuit of FIG. 1.
Figure 6:
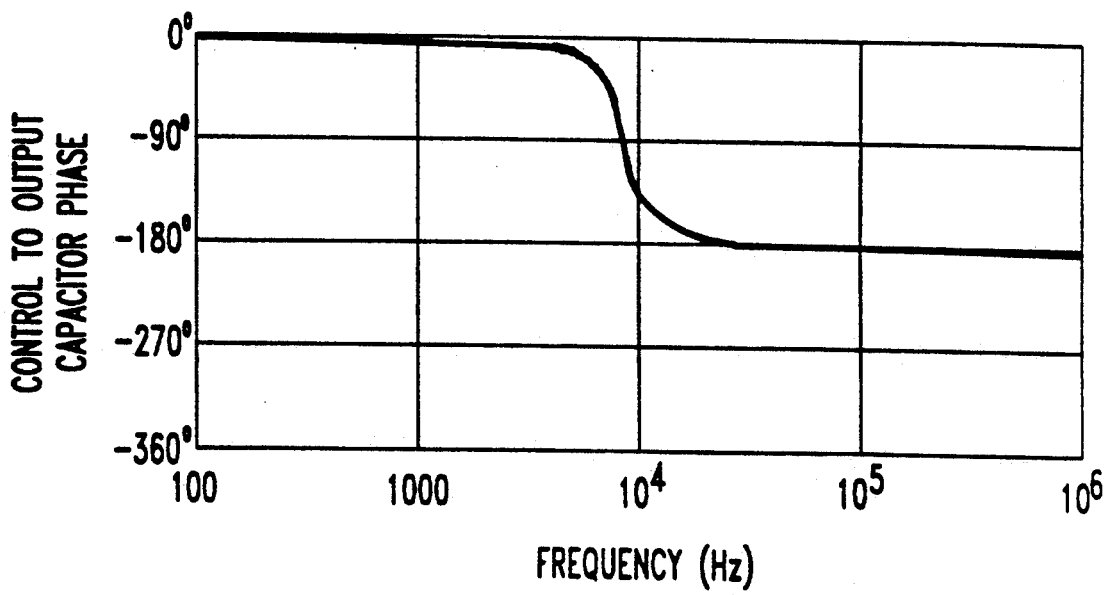
FIGS. 6A and 6B are graphs of control to clamp capacitor gain and control to clamp capacitor phase of the circuit of FIG. 1.

A plot of the duty cycle-to-output transfer function is shown in FIGS. 5 and 6. Here, the clamped mode converter is implemented using practical values for power train components at a 100 W power level. The transfer function can be seen to contain the two double pole pairs (as seen in the characteristic equation, equation [5]) and a double zero. The lower frequency double pole is associated with the output filter and is similar to the double pole seen in conventional topologies. The second double pole is the high Q pair, causing an extreme phase excursion and high peaking. Such peaking near or below the loop crossover frequency would raise stability concerns. Recall that the second pole pair moves as a function of duty cycle.

Figure 7:
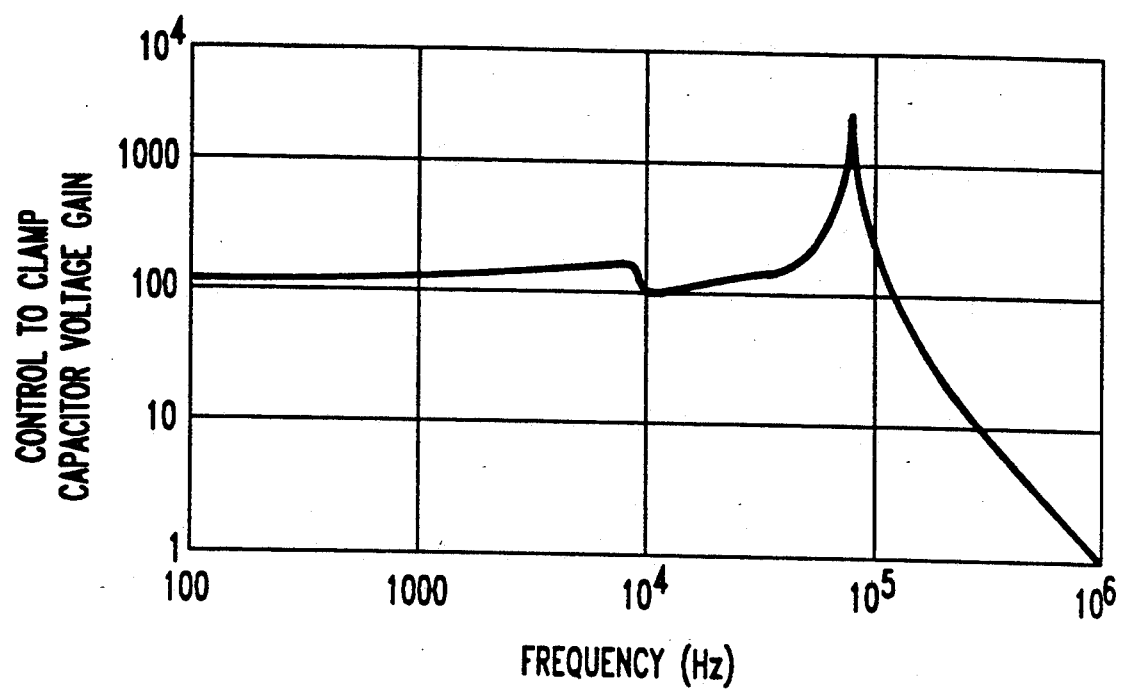
FIG. 7 is a graph showing uncompensated loop phase and uncompensated loop gain in the circuit of FIG. 1.
Figure 8:
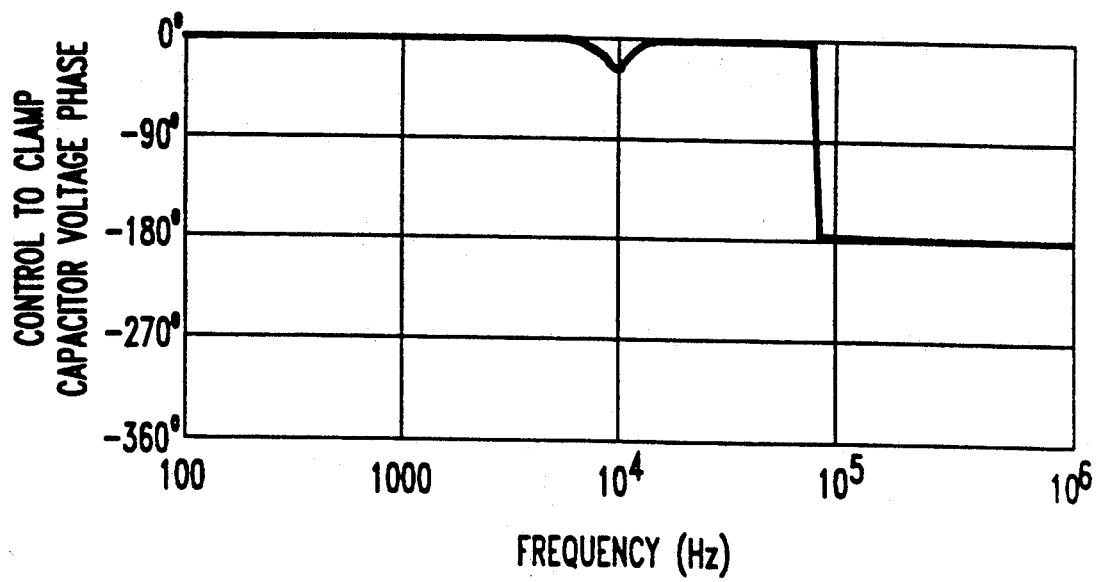
FIG. 8 is a graph showing compensated loop phase and compensated loop gain in the circuit of FIG. 1.

FIGS. 7 and 8 illustrate the duty cycle-to-clamp capacitor transfer function, using the same circuit values as FIGS. 5 and 6. The high Q double pole occurs at the same frequency as in the duty cycle-to-output, and tracks it as a function of duty cycle. A double zero is also present in this transfer function. The choice of component values in this plot causes the double zero to nearly cancel the first double pole. Although complete cancellation is not assured, the presence of this double zero near or below the first double pole provides a fairly flat gain and phase at lower frequencies. The valuable feature of this response is its fairly flat gain except for the high Q double pole, effectively extracting the high Q pole information (resonant frequency and exact damping). Because both the duty cycle-to-output and duty cycle-to-clamp capacitor transfer functions share the same characteristic equation (equation[5]), the location and damping factor for the high Q pole pair is identical in both transfer functions. Feeding back this extracted information allows for cancellation of the high Q double pole from the duty cycle-to-output transfer function, and this cancellation will inherently adapt to variations in operating point and power train component values.

Figure 9:
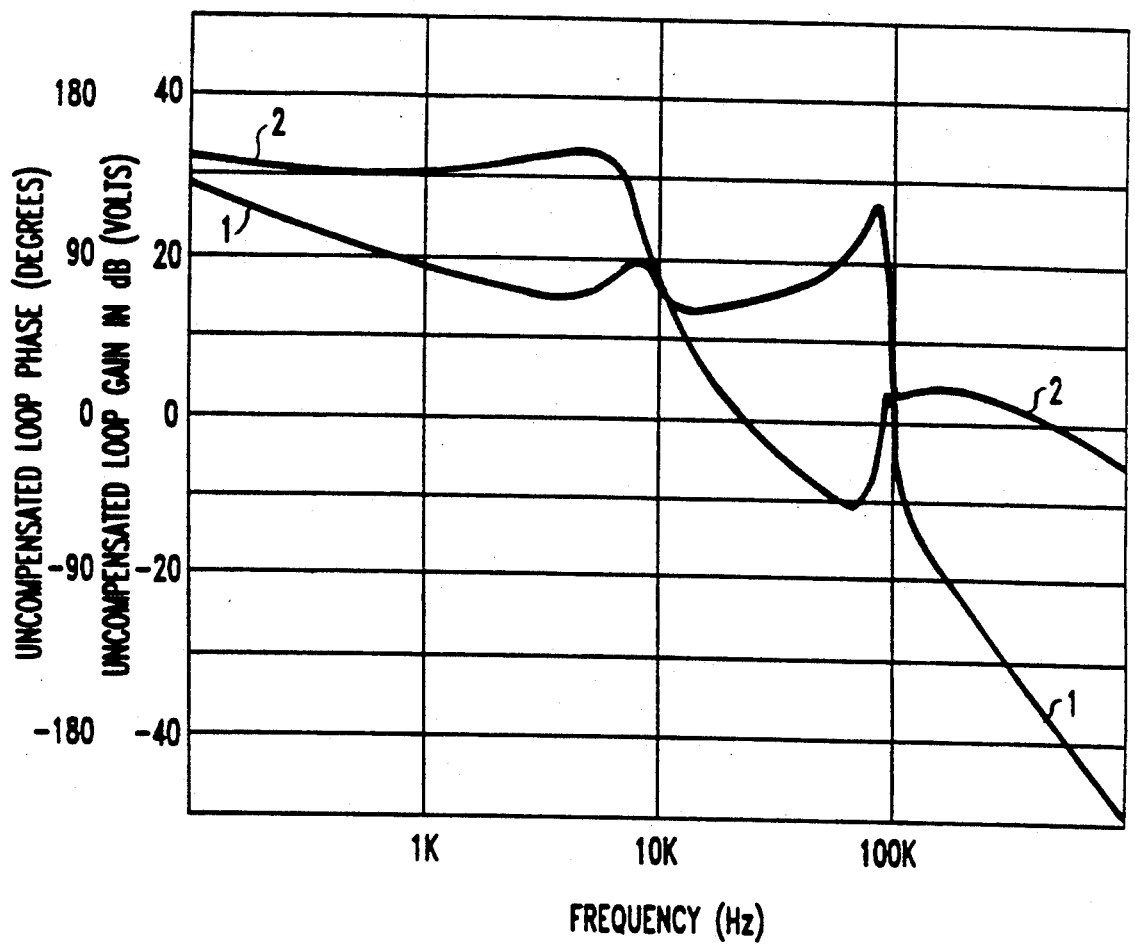

The detrimental effects of the high Q pole can be seen in a simulated closed loop system employing the full wave rectified clamped mode converter power train. FIG. 9 shows the closed control loop response for the simulated circuit. Design of the control loop is hampered by peaking associated with the high Q second pole, and the bandwidth must be intentionally limited to assure that the peaking does not result in conditional stability. Since the high Q pole migrates, the loop must be designed for the worst case operating condition (double pole at the lowest frequency), possibly limiting the input voltage range of the converter. Transient response, output impedance, and audio susceptibility all suffer due to the low gain and narrow bandwidth.

Figure 10:
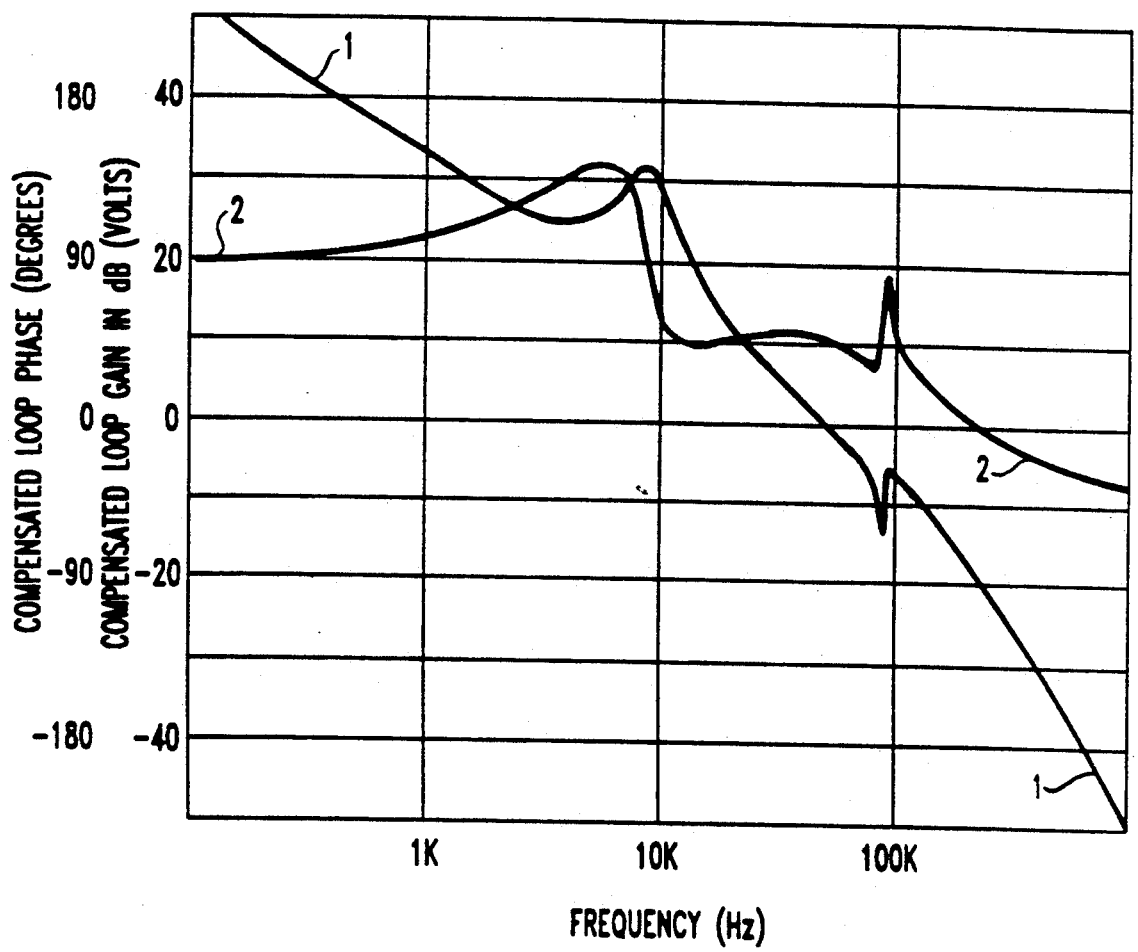

The invention provides multi-state compensation. Any type of current mode control can be applied as usual if desired. The clamp capacitor voltage is sensed, scaled by a gain factor, and summed with the output of the error amplifier (output voltage feedback). At low frequencies, the output voltage feedback has a magnitude much higher than the flat gain of the clamp capacitor, and it dominates the loop response. As a result, the loop gain is unchanged at low frequencies. At frequencies near the high Q pole, the clamp capacitor feedback is scaled such that it cancels the peaking in the output feedback. Since the damping and frequency of the high Q pole is identical for the two feedback signals, the cancellation is accurate and will track as the poles move with duty cycle. The end result is a loop gain without sharp peaking as seen in FIG. 10. The smooth rolloff allows for a much higher crossover frequency, without danger of conditional stability. Phase is predictable and smooth, maximizing possible phase margin. The high bandwidth which is achievable yields improved transient response and audio susceptibility.

We claim:

1. A voltage control circuit comprising:
a transformer having primary and secondary windings;
an input coupled to said primary winding;
means for rectifying current of the secondary winding;
first and second switch devices each coupled to said primary winding of said transformer;
a clamping capacitor coupled to said transformer and to at least one of said first and second switches;
an output filter coupled through said rectifying means to said secondary winding of said transformer;
an output coupled to said output filter;
means comprising a feedback circuit coupled on one side to said output filter and on another side to control terminals of said first and second switches for causing said first and second switches to conduct current alternately;
and means for modifying the energy applied by the feedback circuit to the control terminals of the first and second switches comprising means for coupling the clamping capacitor to said feedback circuit.

2. The voltage control circuit of claim 1 wherein:
said means for modifying the energy comprises means for generating a signal that modifies the magnitude or the phase of energy applied to said control terminals.

3. The voltage control circuit of claim 2 wherein:
said means for modifying the energy comprises means for generating a signal that modifies both the magnitude and phase of the energy applied by the feedback circuit to control terminals of the first and second switches.

4. The voltage control circuit of claim 2 wherein:
said input is adapted to accept DC input energy;
and said output is adapted to deliver to appropriate loads DC output energy of predetermined magnitude, whereby said voltage control circuit constitutes a DC-DC converter.

5. The voltage control circuit of claim 4 wherein:
said feedback circuit comprises a voltage loop controller coupled to a pulse width modulator, the pulse width modulator being coupled to said control terminals of said switches.

6. The voltage control circuit of claim 5 wherein:
the clamping capacitor is coupled to a frequency dependent attenuation network;
and the frequency dependent attenuation network is coupled to said feedback circuit.

7. The voltage control circuit of claim 6 wherein:
said voltage loop controller and said frequency dependent attenuation network are both coupled to an adder circuit which is coupled to the pulse width modulator.

8. The voltage control circuit of claim 7 wherein:
the rectifying means comprises rectifying circuitry connected to the secondary winding of the transformer which includes alternately conducting first and second rectifying diodes;
the output filter being connected to the rectifying circuitry.

9. A clamped mode DC-DC converter comprising:
a transformer having at least one primary winding and at least one secondary winding;
means comprising input terminals coupled to said primary winding for applying input DC voltage to said converter;
a rectifier circuit coupled to said secondary winding;
an output filter coupled to said rectifier circuit;
means comprising output terminals coupled to the output filter for removing DC voltage from said converter;
first and second switch devices, each having a control terminal, coupled to said primary winding of said transformer;
means comprising a feedback circuit coupled on one side to said output filter and on the other side to control terminals of said first and second switches for causing said first and second switches to conduct current alternately;
a clamp capacitor coupled to said transformer and at least one of said first and second switches;
and means for modifying the phase and magnitude of energy applied by the feedback circuit to the control terminals of the first and second switches comprising means for coupling the voltage of the clamp capacitor to the feedback circuit.

10. The converter of claim 9 wherein:
the feedback circuit comprises a voltage loop controller connected to the output filter and a pulse width modulator coupled to said control terminals of said first and second switches;
an output of the voltage loop controller is coupled to a first input of an adder device, said adder device having an output coupled to the pulse width modulator;
and the means for coupling the voltage of the clamp capacitor to the feedback circuit comprises means for coupling the clamp capacitor to a second input of the adder device.

11. The converter of claim 10 wherein:
the feedback circuit is of a type that, in the absence of said coupling thereto of the clamp capacitor voltage, would develop two double pole pairs, one of which is a high Q double pole pair;
and said means for coupling the voltage of the clamp capacitor to the feedback circuit constitutes means for damping said high Q double pole pair.

12. The converter of claim 11 wherein:
said clamp capacitor is coupled to a frequency dependent attenuation network which in turn is coupled to the second input to the adder device;
and said frequency dependent attenuation network has a low-attenuation pass-band at frequencies including said high Q double pole pair.

13. The converter of claim 11 wherein:
said transformer comprises a tapped secondary winding;
and the DC-DC converter constitutes a full-wave rectified DC-DC converter.

14. The converter of claim 11 wherein:
the transformer comprises first and second separate primary windings;
the first primary winding is coupled to the clamp capacitor and the first switch;
and the second primary winding is coupled to the second switch.

15. The converter of claim 11 wherein:
each of the switches is an FET.

16. The converter of claim 14 wherein:
each of the switches is an n-channel enhancement-mode FET.

* * * * *